United States Patent [19]

Fleigle

[11] 4,306,405
[45] Dec. 22, 1981

[54] DRIVE ASSEMBLY FOR ROTARY MOWER OR THE LIKE

[75] Inventor: Donald E. Fleigle, Savannah, Ga.

[73] Assignee: Roper Corporation, Kankakee, Ill.

[21] Appl. No.: 176,114

[22] Filed: Aug. 7, 1980

[51] Int. Cl.³ ............................................. A01D 69/08
[52] U.S. Cl. ..................... 56/11.3; 56/11.8; 192/18 R
[58] Field of Search ................ 56/11.3, 11.6, 11.7, 56/11.8; 192/18 R, 14

[56] References Cited

U.S. PATENT DOCUMENTS

| | | | |
|---|---|---|---|
| 2,930,460 | 3/1960 | Isaacson | 192/18 R |
| 4,122,652 | 10/1978 | Holtermann | 56/11.3 |
| 4,173,269 | 11/1979 | Craig | 192/70.2 |
| 4,213,521 | 7/1980 | Modersohn | 56/11.3 |

Primary Examiner—Robert A. Hafer
Attorney, Agent, or Firm—C. Frederick Leydig; Richard L. Voit; David J. Richter

[57] ABSTRACT

A rotary mower having a drive assembly which provides automatic de-clutching and prompt braking of the mower blade to a stop when the device is left unattended, while the engine keeps running. A blade carrier is mounted on an anti-friction bearing at the lower end of the drive shaft. A driving hub is secured to the drive shaft at a level above the anti-friction bearing. A shiftable shell of upwardly facing bowl shape surrounds the drive hub and defines a clutch space. Mounted on the hub in the clutch space is a stack of clutch discs made up of a set of driving discs keyed to the hub and an interposed set of driven discs keyed to the interior of the shell. The blade holder is keyed to the lower surface of the shell. A set of springs on the blade holder urges the shell upwardly in a direction to apply clutching pressure to the discs for driving of the blade. The shell has an annular lip or flange around its upper edge having a friction surface thereon. A registering annular brake plate presses downwardly against the friction surface for braking rotation and for shifting the shell downwardly to release clutching pressure so that when the device is unattended the blade automatically comes to a stop. A control member arranged for gripping by the operator during active operation holds the brake disc overpoweringly in an upraised position so that the blade is driven only as long as the control member is gripped.

5 Claims, 11 Drawing Figures

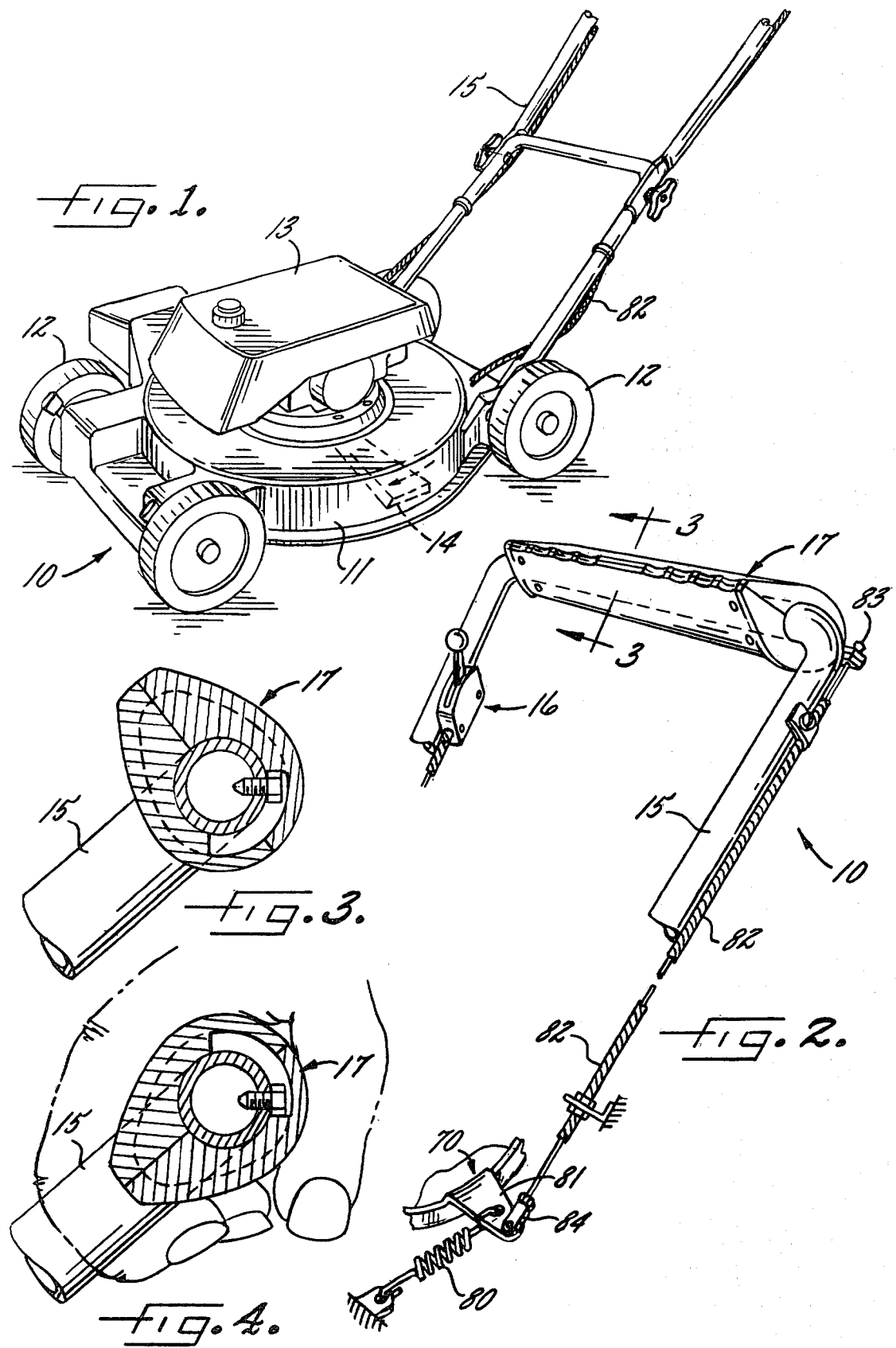

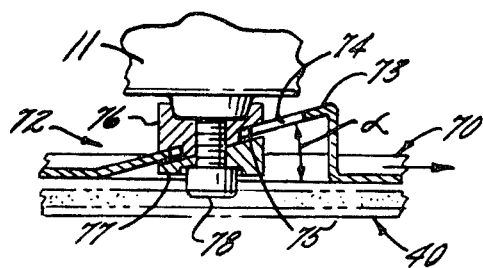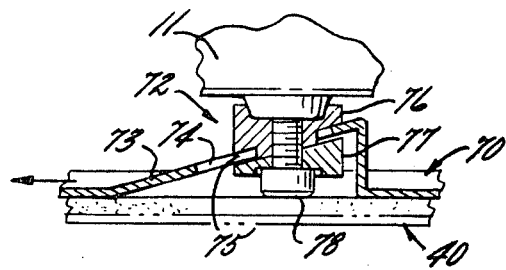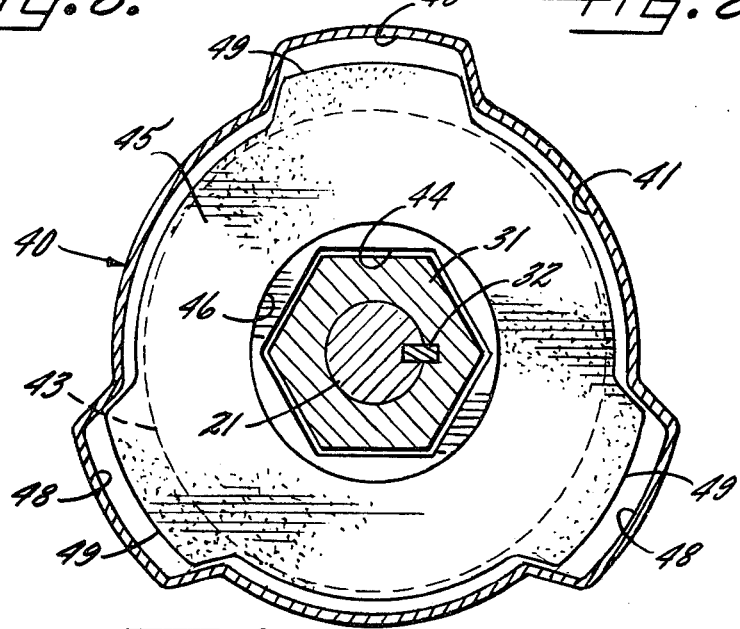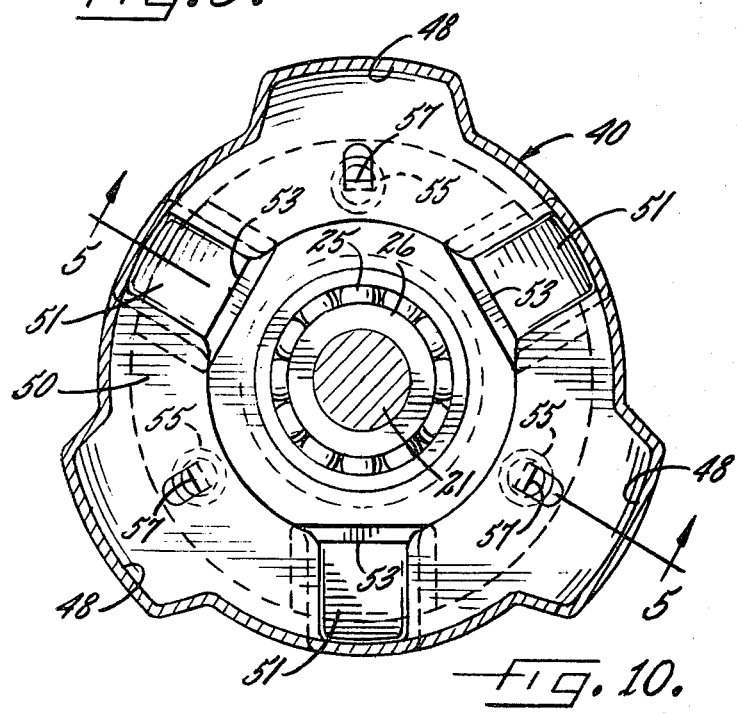

DRIVE ASSEMBLY FOR ROTARY MOWER OR THE LIKE

Much attention has been given to "deadman" type controls for mowers of the rotary blade type since the promulgation of safety regulations requiring this type of control. In one common type of deadman control an axially shiftable member carries a clutch surface engaging a clutch surface on the drive shaft and also an annular friction surface engaging a brake member mounted on the frame. A biasing spring biases the shiftable member in the direction of clutch engagement. A second biasing means is provided for pressing the brake member against the force of the biasing spring to (1) apply the brake and (2) disengage the clutch, with the device reverting to this status when unattended. A manual control member arranged for gripping by the operator overpowers the second biasing means for disengaging the brake and engaging the clutch for driving of the blade.

Prior mechanisms intended for carrying out of the above have, however, tended to become cumbersome and overly complicated. They have also tended to require application of heavy forces to the manual control member, forces which must be sustained as long as the mower is in active use, resulting in inconvenience and operator fatigue.

It is, accordingly, an object of the present invention to provide a drive assembly for a rotary mower or the like to secure automatic de-clutching and braking of the mower blade when the device is left unattended and which provides an enabling control member which is gripped by the operator as long as the mower is in active use but which utilizes control forces which are sufficiently light so that the mower may be operated for long periods of time without fatigue or inconvenience. It is a more detailed object to provide a drive assembly for a rotary mower employing a clutch capable of transmitting large amounts of torque adequate for heavy duty cutting but in which relatively light forces acting through a short distance suffice to engage the clutch faces.

It is another object of the present invention to provide a drive assembly for a rotary mower employing a clutch and brake for alternative engagement but which is highly economical and compact, occupying space which is normally unused and available in a mower of conventional design, thereby permitting the automatic de-clutching and braking feature to be incorporated in mowers of existing design with relatively minor modification and at low cost.

It is another object of the present invention to provide a drive assembly for a rotary mower which is safe and reliable, inherently long-lived, which may be used trouble-free for the life of the mower, but which may be easily and quickly diassembled in the event that cleaning or other corrective maintenance is required.

Other objects and advantages of the invention will become apparent upon reading the attached detailed description and upon reference to the drawings in which:

FIG. 1 is a perspective view of a mower having a drive assembly and control member therefore constructed in accordance with the present invention.

FIG. 2 is a fragmentary perspective showing the upper portion of the mower handle with its control member and control cable.

FIG. 3 is a cross sectional view taken along line 3—3 in FIG. 2 showing the control member in its unattended condition.

FIG. 4 is a view similar to FIG. 3 but showing the control member in active use.

FIGS. 8 and 8a are fragmentary sections through one of the ramps taken along the line 8—8 in FIG. 5.

FIG. 9 is a transverse section taken through the clutch stack along line 9—9 in FIG. 5.

FIG. 10 is a displaced section taken along line 10—10 in FIG. 5.

Figure 5:
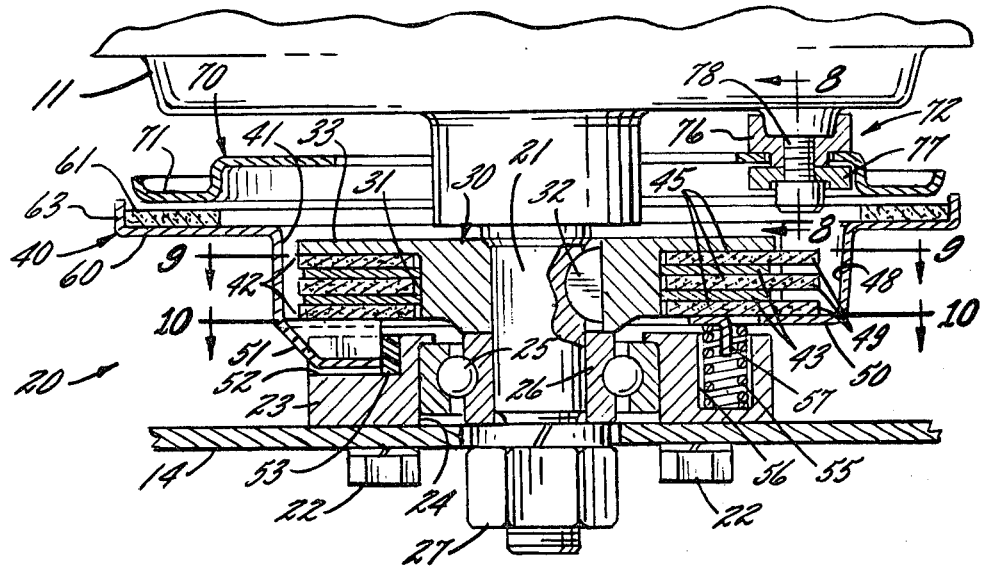
FIG. 5 is an elevational view of the drive assembly in axial section taken along line 5—5 in FIG. 10, with the brake off and the clutch engaged.

While the invention has been described in connection with a preferred embodiment, it will be understood that I do not intend to be limited to the particular embodiment which has been shown but I intend, on the contrary, to cover the various alternative and equivalent constructions included within the spirit and scope of the appended claims.

Referring to FIGS. 1 and 2 there is shown a mower 10 having a frame or housing 11 supported on a set of wheels 12. Superimposed upon the frame is an engine 13 driving a rotary blade 14. For guiding the mower the usual pivoted handle 15 is provided. Mounted on the right-hand side of the handle is a throttle control 16. The handle moreover includes a control member in the form of a rockable hand grip 17. As will become clear, the hand grip, when rocked forwardly, serves to activate a drive assembly interposed between the engine drive shaft and the blade for switching the device from an unattended state in which the cutter blade is braked and de-clutched to a condition of active use in which the brake is released and the clutch is engaged for rotation of the blade. The device reverts to a condition in which the blade is braked and stationary when the hand grip is released, resulting in what is commonly referred to as "deadman" control.

Referring to FIGS. 5-10 the present invention is embodied in a drive assembly 20 interposed between the engine drive shaft 21 and the rotary blade 14.

The blade 14 is secured, by means of screws 22 to a blade carrier 23 which is of generally annular shape having a central opening 24. Contained within the central opening is an anti-friction bearing 25 which may, for example, be of the single row ball type having an inner race 26 which is telescoped over the drive shaft and which is held in place by a clamping nut 27 at the end of the shaft.

Arranged above the bearing 25 is a drive hub 30 having a faceted profile 31, here hexagonal (see FIG. 9), and which is keyed to the shaft 21 by means of a key 32. The hub has an integral rigid flange 33 at its upper end.

Surrounding the drive hub is an axially shiftable shell 40 of upwardly facing hollow cup shape defining a clutch space 41. Telescoped over the hub is a stack 42 of clutch discs, the stack including a set of driving discs 43 having openings 44 having a profile corresponding to that of the hub. Interposed are a set of driven discs 45 having enlarged central openings 46. The discs 43 rotate constantly with the drive shaft 21 while means are provided for coupling the interposed discs 45 to the blade carrier 23.

In accordance with the present invention such coupling is accomplished by forming embossments on the inner peripheral wall of the shell 40 which mate with projections formed on the periphery of the discs 45 and by providing embossments on the under surface of the shell which mate with registering recesses in the blade carrier. The term "embossment" as used herein will be understood to be a general term meaning either a recess or projection having a mating element to provide a positive driving connection. Thus the peripheral wall of the shell 40, indicated at 47, is formed with three radially extending recesses, or pockets, 48 in which are registeringly received integral projections 49 formed on discs 45.

Similarly the under surface of the shell, indicated at 50, and which is generally bowl-shaped, is formed with a set of integral downwardly extending embossments 51. The latter fit into corresponding recesses, or pockets, 52 formed on the top surface of the blade carrier. It will be apparent, then, that the driven clutch discs 45 are all positively coupled, in parallel, to the shell which is in turn coupled to the blade carrier and blade. In accordance with one of the more detailed aspects of the invention resilient cushions in the form of small U-shaped pieces of rubber or rubber-like material, indicated at 53, are interposed between the embossments 51 and the side walls of the pockets 52.

For the purpose of pressing the stack of clutch plates together for driving of the blade, a set of biasing springs are interposed between the blade carrier and the shell for urging the shell upwardly in a direction to apply clutching pressure, with the flange 33 on the hub providing the necessary reaction. The biasing springs, of which three are used, indicated at 55 are in the form of compression coil springs seated in recesses 56 which may be in the form of holes bored in the upper surface of the blade carrier. The springs are dimensioned so that when they are in their relaxed state they extend above the level of the blade carrier to bear against the underside of the shell. To keep the springs centered in their recesses the lower wall 50 of the shell is formed with registering downwardly extending tangs 57.

Figure 6:
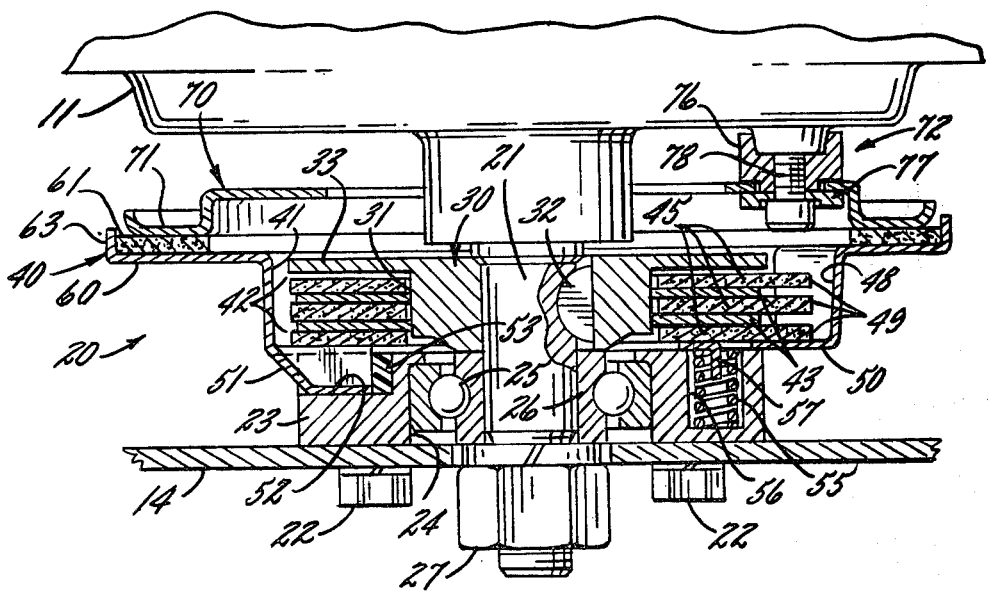
FIG. 6 is a view similar to FIG. 5 but showing the device in the non-attended state with the brake on and the clutch disengaged.
Figure 7:
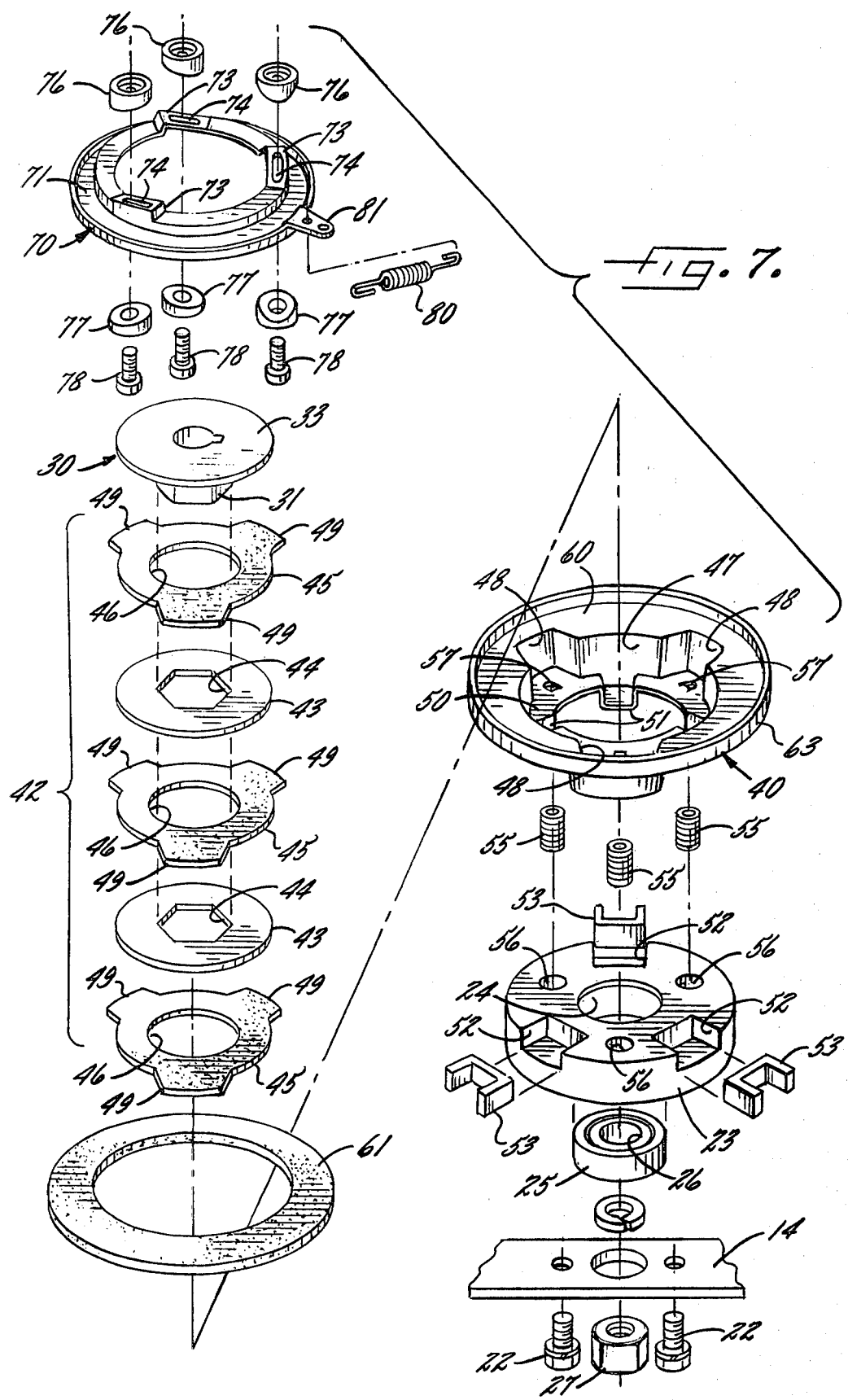
FIG. 7 is an exploded view of the drive assembly.

In carrying out the present invention the shell has an annular flange or lip extending about its upper edge with an upwardly presented friction surface, and an annular brake plate is arranged above the friction surface with its edge surface in a position of register. The brake plate is mounted for movement toward and away from the friction surface on the shell while resisting rotational drag, and means are provided for pressing the brake plate downwardly against the friction surface for (1) braking rotation of the shell and blade and (2) shifting the shell downwardly against the force of the biasing springs for releasing clutching pressure upon the clutch discs so that the blade comes promptly to a stop. Thus as shown in FIGS. 5, 6 and 7, a radially extending flat lip 60 forms an integral part of the shell. Seated on the lip is a friction brake disc 61 of annular shape which is located in position by a peripheral lip 63 on the flange.

Superimposed above the brake disc 61 is an annular brake plate 70 having a downwardly offset edge portion 71. The brake plate is coupled to the frame 11, which in this embodiment is the lower engine casting, and mounted for movement downwardly against the friction surface of disc 61 on the shell to perform the above two functions, i.e., the direct braking of the shell and with continued downward movement of the brake plate serving to compress the springs 55 to release the clamping pressure upon the stack of clutch discs to de-clutch the blade from the drive shaft.

In carrying out the invention a self-energizing connection is provided between the frame and the brake plate to achieve the downward movement of the plate without necessity for any force to be applied by the operator. Such self-energizing connection is in the form of helically oriented ramps angled in such direction that the drag of the brake plate upon the friction surface of the shell tends to crowd the brake plate downwardly into its braked de-clutching condition. A total of three evenly spaced ramp assemblies are used, indicated at 72, and which are indentical to one another, with a typical cross section being shown in FIGS. 8 and 8a. The ramp assembly includes a ramp surface 73 forming an integral part of the brake plate 70. The ramp angle, indicated at $\alpha$ is 15 degrees in this embodiment, but alternatively may be within the range of 5 to 30 degrees. Formed longitudinally in the ramp is a slot 74. Extending downwardly through the slot is a post defining an angled way surface 75. The post is made up of a sleeve 76 and a mating cap 77 having registering axial openings and which are tightly clamped to the frame 11 by means of a central machine screw 78. The ramps 73 and their way surfaces 75, spaced at equal intervals, confine the motion of the brake plate to a shallow helical movement.

An "extension" spring 80, anchored to the frame, is connected to an arm 81 on the brake plate and biases the brake plate into its downwardly extended position in which the edge of the plate engages the frictional surface on the brake disc 61 to establish a drag torque so that the brake plate tends to be dragged rotationally with the disc, with the ramp surfaces acting to complete the downward movement of the plate to place the mechanism in a braked, de-clutched condition.

There is finally provided a connection between the control member 17, in the form of a rockable hand grip, and the brake plate 70, a connection such that when the hand grip is rocked to the actuating position shown in FIG. 4 the brake plate is retracted against the force of the extension spring 80, causing the brake plate to be disengaged and held in an upraised position for releasing the brake and engaging the clutch. The connection between the hand grip 17 and the brake plate is in the form of a cable 82 having an upper connection 83 with the hand grip and a lower connection 84 with the arm 81 on the brake plate. The result is that the blade rotates as long as the control member is gripped and held in the rocked position illustrated in FIG. 4.

It will be apparent that the above construction, while operating at low control pressures, brings about a highly reliable "deadman" type of protection: the hand grip, by reason of the spring 80, and free of gripping force, occupies the position illustrated in FIGS. 2 and 3 with the brake set and the clutch disengaged. Thus when the engine is started the blade does not rotate.

To activate the blade the hand grip is rocked into the position illustrated in FIG. 4. This requires merely enough force to overpower the relatively light extension spring 80 plus the small additional amount of force necessary to separate the braking surfaces as the brake plate rides upwardly upon the ramp. In short, rocking the hand grip disables the brake plate which not only releases the brake but which restores control to the biasing springs 55 which press against the underside of the shell to compress the stack 42 of clutch discs which clutch the blade to the drive shaft.

Very little torque is required to hold the hand grip 17 in its activated position because of the self-energizing nature of the control as a result of which the mower may be used for extended periods without fatigue or inconvenience.

In the event that it is necessary, for any reason, for the operator to leave the mower, release of the hand grip 17 permits the hand grip to restore itself from the position shown in FIG. 4 to the inactive position shown in FIG. 3 accompanied by contraction of the extension spring 80 to rotate the brake plate clockwise (as viewed in FIG. 7) into its downwardly extended position in which the drag of the rotating shell against the braking surface completes the downward ramping of the brake plate, resulting in the application of the brake and disengagement of the clutch surfaces, as discussed. The engine is left running and the blade may be re-started simply by again gripping the rockable hand grip. Because of the multi-disc clutch construction large amounts of torque may be transmitted by the blade even though the biasing springs 55 are of relatively light construction, making the drive assembly ideally suited for heavy duty cutting of weed stalks and light brush.

In spite of its heavy duty capability, the assembly is highly compact, occupying a shallow, normally unused space above the blade which not only permits the mower to be constructed in a compact format but which enables the assembly to be readily incorporated in mowers of existing design.

The construction is not only compact but highly economical. All of the parts are simply formed and the shiftable shell 40 which, as noted, performs a number of different functions, is in the form of an integral stamping of light metal in which the embossments on the side and bottom walls provide the necessary degree of rigidity.

The mechanism is reliable even in the face of the rough conditions existing in the field, does not have any adjustments to get out of whack and may be expected to operate trouble-free for long periods of time. However, when disassembly is necessary for cleaning or renewing the surfaces of the clutch discs or brake, the device may be easily and quickly disassembled. The shell 40 is simply floating and drops away when the carrier 23 is released by the clamping nut 27. Removal of the shell exposes the braking and ramp surfaces so that they, if necessary, may also be cleaned.

There is a subsidiary feature of the construction which provides additional insurance that the blade is at all times safely captive. Thus the blade has a central clearance opening 85 for the drive shaft 21 and through which the end of the drive shaft extends, with the clamping nut 27 at the end thereof being seated upon an annular spacer 86 which may, for example, be in the form of a lock washer. If easy removability of the blade for sharpening purposes is desired, the clearance hole 85 may be made large enough to clear the clamping nut, in which case the blade may be removed by simply unscrewing the two screws 22. On the other hand, the clearance hole may optionally be made smaller than the outer dimension of the nut 27 so that the blade is held captive with the blade holder as long as such nut is in place.

While the invention has been described in connection with use of a rockable hand grip as the control member, it will be understood that the invention is not limited thereto and any convenient grippable operator may be employed at the upper end 83 of the control cable. Also while the invention has been described in connection with a rotary mower its use is not limited thereto and it will be apparent to one skilled in the art that the construction is equally applicable wherever a load is to be alternatively clutched and braked to provide a deadman type of control. For example, the carrier 23, which in the present embodiment carries the blade 14, may, instead, be connected to any other active and possibly hazardous driven element. Or the carrier may be coupled to a set of ground engaging wheels, in which case the manual control would provide forward driving on a deadman protective basis. Because of the utility of the assembly in other embodiments it will be understood that the directions employed in the description as, for example, "above" and "below" will be understood to be relative and that the assembly may be operated with advantage in any desired orientation.

While the preferred embodiment of the invention employs a stack of clutch discs, it will be understood that the term "stack" is not limited to any particular number of discs and covers an arrangement in which there are at least two clutching surfaces.

What I claim is:

1. A drive assembly for a rotary mower or the like providing automatic de-clutching and braking of the mower blade when the device is left unattended which comprises, in combination, a frame, a drive shaft, an annular blade carrier having means for securing a blade to its underside, an anti-friction bearing mounting the blade holder for rotation at the lower end of the drive shaft, a drive hub secured to the drive shaft at a level above the anti-friction bearing, the lower end of the drive shaft being threaded for reception of a threaded clamping member for securing the hub and bearing rigidly to the shaft in stacked relation, an axially shiftable shell of upwardly facing hollow bowl shape surrounding the drive hub with an axial opening for clearing the drive shaft and defining a clutch space, a stack of clutch discs of annular shape mounted on the hub in the clutch space, the stack including a set of driving clutch discs keyed to the hub and an interposed set of driven clutch discs keyed to the interior of the shell, interengaging means for keying the blade holder to the under surface of the shell, a set of biasing springs interposed between the blade carrier and the shell for urging the shell upwardly in a direction to apply clutching pressure to the stack of clutch discs so that torque is transmitted from the shaft through the shell and the carrier for driving the blade, the shell having an annular outwardly extending flat lip about its upper edge presenting an upwardly facing friction surface, an annular brake plate arranged above the friction surface with its edge portion registering therewith, means mounting the brake plate on the frame for movement toward and away from the friction surface on the shell, means for coupling the brake plate to the frame to resist rotational drag, means for pressing the brake plate downwardly against the friction surface on the shell for (1) braking rotation of the shell and blade and (2) shifting the shell downwardly against the force of the biasing springs for releasing clutching pressure upon the clutch discs so that the blade is stopped, and a manual control member arranged for convenient gripping by the operator during normal operation of the device for over-powering the pressing means and for holding the brake plate in an upraised position so that the blade is driven only as long as the control member is gripped.

2. The combination as claimed in claim 1 in which the brake plate has a helically ramped connection with the ramps angled in such a direction that the drag of the brake plate upon the friction surface tends to crowd the brake plate downwardly into a braked de-clutching condition, and an extension spring on the brake plate connected to urge the brake plate into an extended position providing initial engagement with the friction surface, the manual control member being coupled to the brake plate in such a way as to retract the brake plate and to overcome the force of the extension spring as the control member is manually gripped.

3. The combination as claimed in claim 1 in which the shiftable shell has an internal peripheral wall and an undersurface, the shell being made of thin metal with embossments on its internal wall for keyed engagement with the driven clutch discs and with embossments formed on its under surface for keyed engagement with the blade carrier.

4. The combination as claimed in claim 1 in which the blade carrier has registering embossments keyed to the embossments on the undersurface of the shiftable shell to provide a set of torque transmitting surfaces, and peripherally facing cushions of elastomeric material interposed at the torque transmitting surfaces.

5. The combination as claimed in claim 1 in which the blade carrier has a central opening fitted to the outer race of the anti-friction bearing and of comparable axial thickness and in which the biasing springs are in the form of axially oriented coil springs substantially recessed into registering openings in the blade carrier.

* * * * *